United States Patent [19]
Worrell et al.

[11] Patent Number: 5,298,235
[45] Date of Patent: Mar. 29, 1994

[54] ELECTROCHEMICAL DEVICES BASED ON SINGLE-COMPONENT SOLID OXIDE BODIES

[75] Inventors: Wayne Worrell, Narberth; Peter K. Davies, Yardley, both of Pa.

[73] Assignee: The Trustees of The University Of Pennsylvania, Philadelphia, Pa.

[21] Appl. No.: 808,432

[22] Filed: Dec. 16, 1991

[51] Int. Cl.$^5$ .............................................. H01M 8/10
[52] U.S. Cl. ..................................... 429/33; 427/115; 428/701; 204/282; 204/245
[58] Field of Search ........................... 429/33; 427/115; 428/701; 204/282, 295

[56] References Cited

U.S. PATENT DOCUMENTS

| | | | |
|---|---|---|---|
| 3,607,429 | 9/1991 | Maki et al. | 429/33 X |
| 3,634,113 | 1/1972 | Fehrenbacher | 429/33 X |
| 4,134,042 | 7/1992 | Madou et al. | 429/33 X |
| 4,791,079 | 12/1988 | Hazbun. | |
| 4,892,849 | 1/1990 | Cankford | 501/97 |

OTHER PUBLICATIONS

Logothetis, Adv. in Cermamics, 1981, 3, 388–405.
Haaland, J., J. Electrochem, 1980, 127, 796–804.
Worrell, Proc of Symp. on Electrochemistry and Solid State Science Education, ed. by Smyrl and Mclarnon, pp. 98–109, The Electrochemical Society, Pennington, N.J. (1987).
Kleitz, et al., Proceed of the Int. Meeting on Chemistry Sensors, vol. 17, Anal. Chem, Symp. Series, pp. 262–272, Elsevier, N.Y.C. (1983).
Lukaszewicz et al., Sensors and Actuators, 1990, B1, 195–198.
Worrell, Proceedings of the EPRI/GRI Workshop on Ceramic Conductors for Solid State Electrochemical Devices, Snowbird, Utah, May 12–15, 1991.
Worrell et al., Proceedings of the First International Symposium on Iionic and Mixed Conducting Ceramics, ed. Ramanarayanan and Tulelr, Proceedings vol. 91–12 (1990) (no date).
Worrell et al., Solid Oxide Fuel Cells, ed. by Singhal, Proceedings vol. 89–11, pp. 81–89, The Electrochemical Society, Pennington, N.J. (1989).
Bugraff, et al., Solid State Ionics, 1986, 18/19, 807.
Van Dijk et al., Solid State Ionics, 1983, 9/10, 913.
Teroaka et al., Mat. Res. Bull, 1988, 23, 51.
Mizusaki et al., J. Solid State Chem., 1985, 58, 257.
Mizusaki, J. Amer. Ceram. Soc., 1983, 66, 247.
Teraoka et al., Mat. Res. Bull, 1988, 23, 51.
Barnett, Energy, 1990, 5, 1.
Barnett et al., Proceedings of the EPRI/GRI Workshop on Ceramic Conductors for Solid State Electrochemical Devices, Snowbird, Utah, May 12–15, 1991.

Primary Examiner—Stephen Kalafut
Assistant Examiner—M. Nuzzolillo
Attorney, Agent, or Firm—Woodcock Washburn Kurtz Mackiewicz & Norris

[57] ABSTRACT

Single-component bodies useful in fuel cells and other electrochemical devices are provided. In preferred embodiments, the single-component bodies comprise an anodic region at a first side, a cathodic region at a second, non-adjacent side, and an oxygen ion-conducting region substantially free from anodic or cathodic character disposed between said anodic and cathodic regions. The single-component bodies comprise either transition metal perovskites or oxide electrolytes such as yttria-stabilized zirconia doped with multivalent cations.

39 Claims, 3 Drawing Sheets

ELECTROCHEMICAL DEVICES BASED ON SINGLE-COMPONENT SOLID OXIDE BODIES

FIELD OF THE INVENTION

This invention relates to electrochemical devices incorporating solid oxide bodies, to solid oxide fuel cells useful in the generation of electric current, and to solid oxide fuel cells fabricated from single-component solid oxide bodies.

BACKGROUND OF THE INVENTION

Solid oxide fuel cells (SOFCs) operate by converting chemical energy directly to electricity by way of an isothermal electrochemical oxidation process that is not governed by the Carnot cycle thermodynamics characteristic of other energy conversion devices. SOFCs typically possess efficiencies approaching 90 percent and therefore require lower energy input to produce a specific amount of power. Additionally, SOFC performance is relatively independent of the power plant size.

During operation of a SOFC, an oxidant such as air or some other oxygen-containing medium typically is introduced at a cathodic portion of the fuel cell, and a fuel such as hydrogen, carbon monoxide, natural gas, or coal-derived gas is introduced at an anodic portion. Upon application of an external load, oxygen at the cathode (air electrode) reacts with incoming electrons from an external circuit to generate oxygen ions, which then migrate to the anode (fuel electrode) through an oxygen ion-conducting electrolyte within the body of the fuel cell. At the anode, the fuel is electrochemically oxidized with these oxygen ions to liberate electrons to an external circuit. The oxidation occurring at the fuel electrode causes current to flow through the external circuit, returning electrons to the air electrode to form more oxygen ions.

Traditionally, solid oxide fuel cells have been fabricated as multiple-component assemblages such as laminates which during operation suffer from a variety of problems attributable to thermal, mechanical, and chemical incompatibilities between each component. These problems have included poor fuel tolerance, limited chemical and thermal endurance, complex and expensive fabrication techniques, and poor mechanic durability. For example, many multiple-component fuel cells can only be energized and de-energized a few times before the component layers de-laminate due to differential thermal expansion and contraction.

Accordingly, there exists a need for new fuel cells which eliminate or at least minimize the problems associated with multiple component structures.

OBJECTS OF THE INVENTION

It is therefore one object of the invention to provide electrochemical devices such as solid oxide fuel cells having simpler designs, fewer fabrication problems, higher durability, and lower processing costs than those known in the art.

It is a further object of the invention to provide such features in single-component solid oxide fuel cells (SCOFCs) having the required electrical, electrochemical, chemical, and catalytic properties.

It is a still further object to provide SCOFCs capable of operating in a moderate temperature range (800° C. or less), to provide additional advantages such as reduced materials costs and improved cell performance.

SUMMARY OF THE INVENTION

These and other objects are achieved by the present invention, which provides electrochemical devices such as fuel cells comprising multi-sided, single-component bodies which, in turn, comprise an anodic region at a first side, a cathodic region at a second side not adjacent the first side, and an oxygen ion-conducting region substantially free from anodic or cathodic character disposed between the anodic and cathodic regions. In certain embodiments, the single-component bodies comprise oxide electrolytes doped with multivalent cations. In other embodiments, the single-component bodies comprise transition metal perovskites Also provided are multi-sided, single-component, bodies having ether an anodic region or a cathodic region at a single side.

The present invention also provides methods for fabricating single-component solid oxide fuel cells. In certain embodiments, these methods comprise the steps of providing a single-component body comprising an oxide electrolyte having the formula:

$$R_xM_{1-x}O_{2-x/2} \qquad (1)$$

wherein R is at least one rare earth element such as yttrium, samarium, ytterbium, calcium, or strontium; M is at least one metal selected from the group consisting of zirconium, cerium, and bismuth; and x is from about 0.05 to about 0.25. The processes further comprise contacting a first side of such a body with a first dopant to form an anodic region at the first side, and/or contacting a second, non-adjacent side of the body with a second dopant to form a cathodic region at the second side. Said contacting is effected such that the anodic region is separated from the cathodic region by an oxygen ion-conducting region substantially free from dopant. In certain embodiments, only one side is contacted with dopant to form either an anodic or a cathodic region.

In another aspect, the invention provides a process for fabricating single-component, multi-sided bodies comprising transition metal perovskites having the formula:

$$ABO_{3-z} \qquad (2)$$

wherein A is $Ln_{1-x}D^{2+}{}_x$; Ln is at least one lanthanide such as lanthanum, yttrium, or strontium; D is at least one divalent metal such as calcium, barium, or strontium; B is $N_{1-y}Q_y$ where N and Q are transition metals such as chromium, manganese, iron, cobalt, nickel, copper, or vanadium; x is 0 to about 1; y is 0 to about 1; and z is less than 3. In fuel cells comprising such bodies, anodic and cathodic regions are established by an oxygen pressure gradient which results from exposure of the first side of the body to fuel and the second side of the body to air or other oxygen-containing gas mixtures. In certain embodiments, multi-sided bodies comprising transition metal perovskites have either an anodic or a cathodic region at only one side.

The single-component oxide fuel cells (SCOFCs) of the present invention are provided using a new materials approach to the development of efficient, fuel-tolerant fuel cells. Single-component cells eliminate the mechanical and chemical compatibility problems associated with current designs, and also provide significant technological advantages, including simplified cell design, fewer fabrication problems, and lower processing costs as compared with solid oxide fuel cells of the prior art.

The catalytic, electrochemical, and chemical characteristics of the provided novel fuel cell systems are ideally suited for the development of high efficiency, thin-film, SCOFCs operating in the temperature range of approximately 600° C. to 800° C. An SCOFC operating in the moderate temperature range of 600° C. to 800° C. offers additional advantages in reducing materials costs and improved cell performance. These advantages include the elimination of the high temperature corrosion of system components, ease of multiple-cell stack sealing, and increased options for interconnection materials including metals and alloys.

BRIEF DESCRIPTION OF THE FIGURES

The numerous objects and advantages of the present invention may be better understood by those skilled in the art by reference to the accompanying figures, in which.

DETAILED DESCRIPTION OF THE INVENTION

The present invention applies a new materials approach to produce electrochemical devices containing single-component bodies. Devices such as fuel cells are based on a single oxide component in which the appropriate conduction characteristics are produced either by chemically modifying oxide electrolytes to produce n-type mixed-conducting anode regions and/or p-type mixed-conducting cathode regions, or by chemically tailoring electronically conducting perovskites to produce an oxygen-ion conduction region between the n- and p-type mixed conducting regions. Other electrochemical devices such as oxygen sensors are based on a single component in which an oxide electrolyte or transition metal perovskite is modified to produce either an n-type mixed-conducting anode region or a p-type mixed-conducting cathode region. It will be understood that "mixed conducting" as employed herein denotes a region exhibiting both oxygen-ion and electronic (n- or p-type) conductivity.

Figure 1:
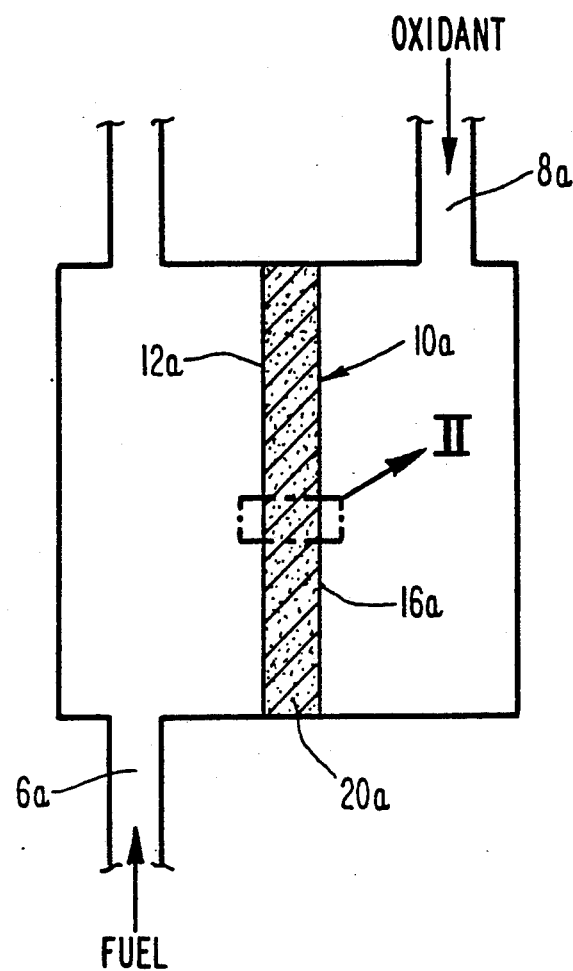
FIG. 1 is a cross-sectional view of a planar fuel cell of the invention.
Figure 2:
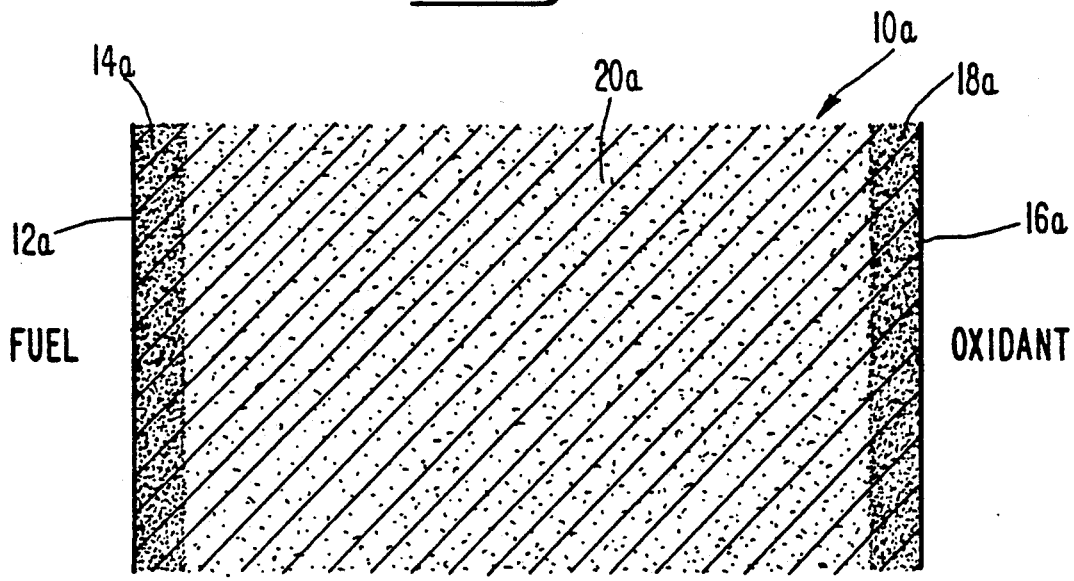
FIG. 2 is a cross-sectional view of the planar fuel cell shown in FIG. 1, as indicated by lines IIa—IIa and IIb—IIb.
Figure 3:
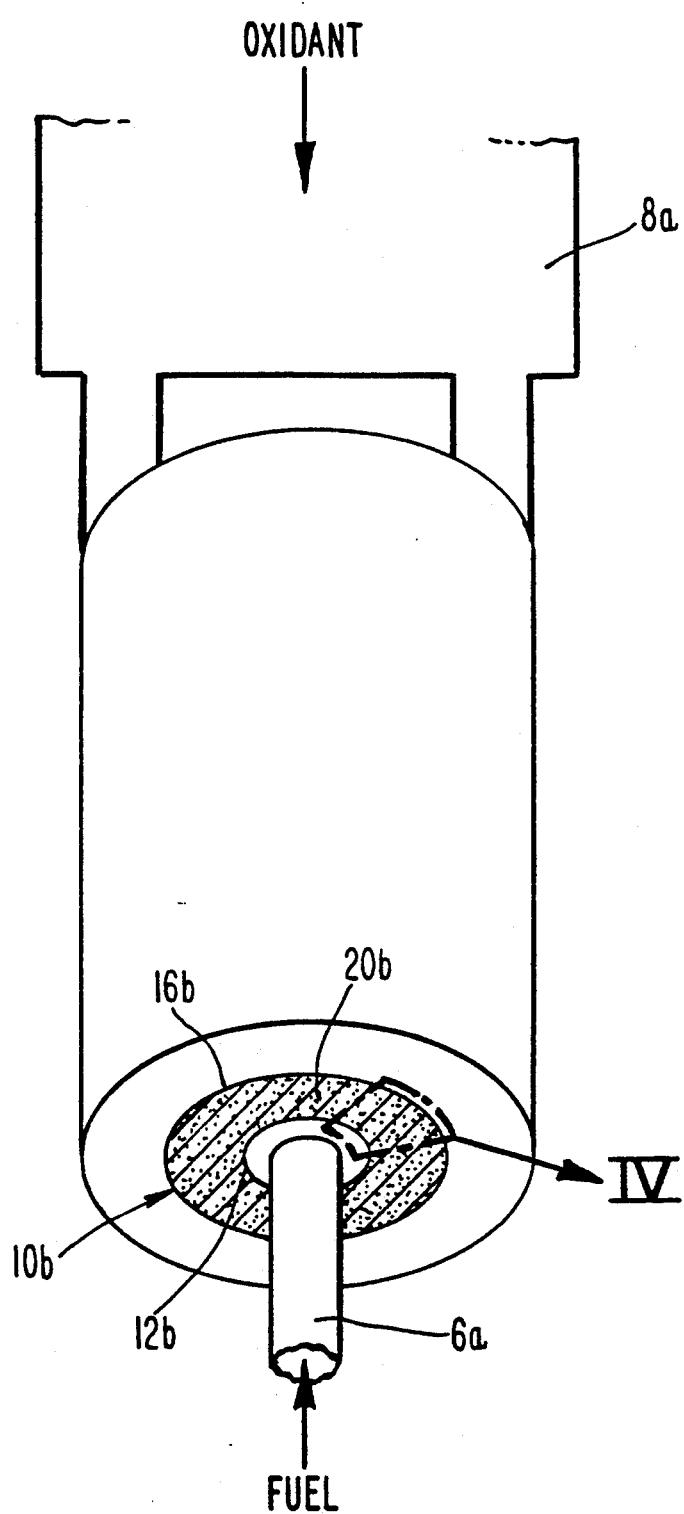
FIG. 3 is a perspective cross-sectional view of a tubular fuel cell of the invention.
Figure 4:
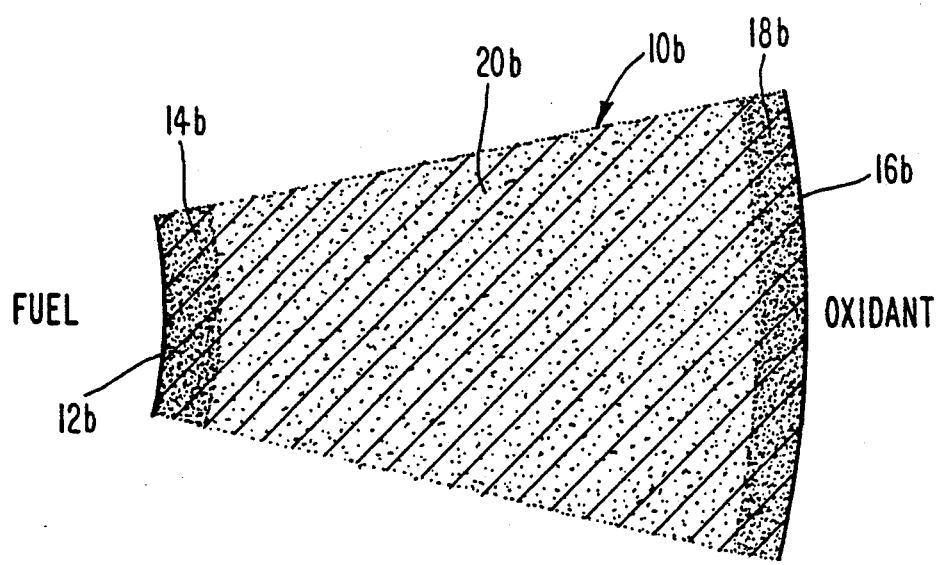
FIG. 4 is a cross-sectional view of the tubular fuel cell shown in FIG. 3, as indicated by lines IVa—IVa and IVb—IVb.

The single-component bodies of the present invention can be used in virtually any known solid oxide fuel cell design. Preferred, non-limiting, fuel cell designs are shown in FIGS. 1-4, wherein first sides 12a,b of single-component bodies 10a,b are in contact with fuel provided via means 6a,b and second, non-adjacent sides 16a,b are in contact with oxidant provided by conduits 8a,b or some other suitable means. The bodies individually comprise n-type mixed conducting anodic regions (14a,b) at the first sides, p-type mixed conducting cathodic regions (18a,b) at the second sides, and oxygen ion-conducting regions (20a,b) disposed between the n-type and p-type regions. A tubular fuel cell design is indicated by FIGS. 3 and 4, wherein the first side (12b) and the second side (16b) are somewhat concentric.

As will be recognized, the single-component bodies of the invention also can be used a wide variety of other electrochemical devices. For example, a multi-sided, single-component body having either an n-type mixed conducting anodic region or a p-type mixed conducting cathodic region at one side can be used in fabricating oxygen sensors of the type generally disclosed by, for example, Logothetis, Adv. in Ceramics, 1981, 3, 388-405; Haaland, J. Electrochem., 1980, 127, 796-804; Worrell, Proc. of Symp. on Electrochemistry and Solid State Science Education, ed. by Smyrl and Mclarnon, pp. 98-109, The Electrochemical Society, Pennington, N.J. (1987); Kleitz, et al., Proceed of the Int. Meeting on Chem. Sensors, Vol. 17, Anal. Chem. Symp. Series, pp. 262-272, Elsevier, N.Y.C. (1983); and Lukaszewicz, et al., Sensors and Actuators, 1990, B1, 195-198.

In certain embodiments, the single-component bodies of the present invention are fabricated from oxide electrolytes containing multivalent ions. In preferred embodiments, oxide electrolytes have formula (1):

$$R_xM_{1-x}O_{2-x/2} \qquad (1)$$

wherein R is a rare earth element such as yttrium, samarium, ytterbium, calcium, or strontium; M is a metal such as zirconium, cerium, or bismuth; and x is from about 0.05 to about 0.25. Preferred oxide electrolytes have the formulas $Y_xZr_{1-x}O_{2-x/2}$ (yttria-stabilized zirconia; YSZ) and $Sa_{1-x}Ce_{1-x}O_{2-x/2}$ (samaria-stabilized ceria; SSC). YSZ is particularly preferred. The selected oxide electrolyte should possess good chemical stability and high oxygen ion conductivity at the fuel cell operating temperatures.

The chemistry of these oxides is modified in accordance with the present invention to provide either n- and p-type mixed conduction, respectively, at the opposing sides or n- or p-type conduction at a single side. For example, catalytically active, low resistance, n- and p-type mixed conducting yttria-stabilized zirconia (YSZ) can be produced by doping YSZ with, for example, titania or terbia, respectively. In one preferred embodiment, titania (titanium oxide) is introduced into one side of the oxide electrolyte having formula (1) to produce n-type conductivity and a mixed-conducting anode. One unique property of these YSZ-titania regions is that they exhibit mixed oxygen-ion and n-type electronic conductivity at oxygen pressures below $10^{-12}$ atmospheres. This is due to the presence of both $Ti^{4+}$ and $Ti^{3+}$, and the associated electron hopping which occurs in low oxygen pressure environments. See, e.g., Worrell, Proceedings of the EPRI/GRI Workshop on Ceramic Conductors for Solid State Electrochemical Devices, Snowbird, Utah, May 12-15, 1991; Worrell, et al., Proceedings of the First International Symposium on Ionic and Mixed Conducting Ceramics, ed. by Ramanarayanan and Tuller, Proceedings Volume 91-12, Worrell, et al., Solid Oxide Fuel Cells, ed. by Singhal, Proceedings Volume 89-11, pp. 81-89, The Electrochemical Society, Pennington, N.J. (1989).

The percentage of n-type electronic conductivity in, for example, YSZ-titania solutions of the invention can be varied from 0 to 100 percent by changing the amount of the titania addition. One procedure for dissolving titania into YSZ is disclosed by Worrell, et al., Solid Oxide Fuel Cells, ed. by Singhal, Proceedings Volume 89-11, pp. 81-89, The Electrochemical Society, Pennington, N.J. (1989). A 5 to 10 mole percent variation in the titania concentration increases the percentage of electronic conductivity from 10 to 85 percent at 800° C. Typical oxygen pressures at the fuel-gas electrode (anode) are $10^{-18}$ to $10^{-22}$ atm. Under these conditions a surface region of yttria-stabilized zirconia containing titania would have excellent n-type, mixed conductivity. U.S. Pat. Nos. 4,791,079 and 4,827,071, both in the name of Hazbun, confirmed that yttria-stabilized zirconia-titania is also an effective catalytic membrane for hydrocarbon conversion.

Other oxides can be employed in accordance with the present invention to produce n-type electronic conductivity in oxide-electrolyte surface regions at low oxygen pressures. The most likely candidates are oxides that show a significant range of solid solubility in the fluorite lattice of the oxide electrolyte and can be stabilized in a mixed valence state under the reducing conditions experienced at the anode.

N-type mixed conducting surface regions can be established in oxide electrolytes by at least two techniques. The first technique involves substitution for tetravalent M using cations with accessible trivalent states. In addition to titanium, other systems include $Ce^{4+/3+}$, $Pr^{4+/3+}$, coupled $(R)^{3+}$-$Nb^{5+}$ substitutions leading to $Nb^{4+}$ formation under reducing conditions, and vanadium oxides. The second technique involves substitution for R with multivalent ions having accessible divalent states. Useful oxides of this first technique include rare earth oxides such as $Yb_2O_3$ ($Yb^{3+}/Yb^{2+}$) and $Eu_2O_3$ ($Eu^{3+}/Eu^{2+}$), transition metal oxides such as $Fe_2O_3$ ($Fe^{3+}/Fe^{2+}$) and $Mn_2O_3$ ($Mn^{3+}/Mn^{2+}$), and reduced vanadium oxides. It will be recognized that the term "rare earth" is descriptive of elements having atomic numbers 21, 39, and 57, that the term "lanthanide" is descriptive of elements having atomic numbers 58-71, and that the term "transition metal" is descriptive of elements having atomic numbers 21-31, 39-49, and 71-81. The procedures for introducing these oxides would be similar to those used for titania dissolution.

Mixed-conducting p-type cathodic regions can be established in oxide electrolytes having formula (1) by, for example, substitution of trivalent R-stabilizing cations by ions with stable 3+/4+ mixed valences under high oxygen pressure, or by substitution of tetravalent M by cations with stable 4+/5+ states. M can also be substituted with $Bi^{3+/5+}$ or the higher oxidation states of transition metals such as iron, manganese, and chromium.

Multivalent cations that produce significant p-type conductivity at stabilized oxide electrolyte surfaces have stable mixed-valences under oxidizing conditions. For example, terbium (Tb) substitutions in both zirconia and ceria (cerium oxide) can lead to the formation of outstanding p-type u mixed conductors with conductivities exceeding $10^{-2}$ S.cm$^{-1}$ at 700° C. See, e.g., Burgraaf, et al., Solid State Ionics, 1986, 18/19, 807 and Van Dijk, et al., Solid State Ionics, 1983, 9/10, 913.

As will be recognized, the oxide electrolytes $R_xZr_{1-x}O_{2-x/2}$ and $R_{1-x}Ce_{1-x}O_{2-x/2}$ generally crystallize in fluorite-related structures for x less than 0.5. When x equals 0.5 they can be stabilized in the pyrochlore structure which is an ordered variant of fluorite. P-type mixed conduction can be introduced into both structure types using cations with variable valency, in particular by Tb-substitutions. The stabilization of $Tb^{4+/3+}$ mixed valences in air at temperatures between approximately 600° C. to 900° C. leads to outstanding p-type electronic conductivities. By controlling the total Tb content, and by using different thermal treatments to produce fluorite, pyrochlore and fluorite-pyrochlore nano-composite structures, the percentage of the electronic contribution to the total conductivity of both ceria and zirconia oxides can be varied from 0 to 100 percent. For excellent cathodic behavior, the optimum multivalent-cation ratio that produces significant p-type conductivity in yttria-stabilized zirconia must be stable in an oxidizing environment such as air. Thus, terbia-substituted YSZ is a preferred cathode surface. Other oxides which can be employed in accordance with the present invention to produce p-type mixed-conducting regions in oxide electrolytes of formula (1) at high oxygen pressures include the oxides of bismuth and those of transition metals such as iron, manganese, and vanadium which exhibit multiple oxidation states in air.

Certain single-component bodies according to the present invention comprise mixed-conducting transition metal perovskites having formula (2):

$$ABO_{3-z} \qquad (2)$$

wherein A is $Ln_{1-x}D^{2+}{}_x$; Ln is a lanthanide such as lanthanum, yttrium, or strontium; D is a metal such as calcium, barium, or strontium; B is $N_{1-y}Q_y$ where N and Q are transition metals such as chromium, manganese, iron, cobalt, nickel, copper, or vanadium; x is 0 to about 1; y is 0 to about 1; and z is less than 3.

The oxygen-ion conductivities of certain transition metal perovskites having formula (2) can exceed those of many solid oxide electrolytes. For example, Teraoka, et al., Mat. Res. Bull, 1988, 23, 51, disclosed that at 800° C. the ionic conductivities of $La_{1-x}Sr_xCo_{1-y}Fe_yO_{3-z}$ perovskites are at least two orders of magnitude higher than that of YSZ. The major obstacle to the formation of a single-component fuel cell from these transition metal perovskites is the establishment of an oxygen ion-conducting region between n- and p-type mixed conducting electrodes. In accordance with the present invention, the chemistry of selected perovskites is controlled by an appropriate divalent cation substitution to maximize the oxygen vacancy concentration such that the oxygen-pressure gradient typically present under fuel cell operating conditions produces an efficient SCOFC in which the p- and n-type mixed-conduction regions are separated by an electrolyte region exhibiting high oxygen ion conductivity.

For a perovskite to sustain intrinsic n- and p-type conductivity, it must contain ions that can be stabilized in three different oxidation states. There are several transition metal ions that can meet these criteria. However, for a single-component oxide fuel cell, it is essential that these three oxidation states can be stabilized in the same structural host over the wide range of oxygen pressures experienced between the anode and cathode sides.

Figure 5:
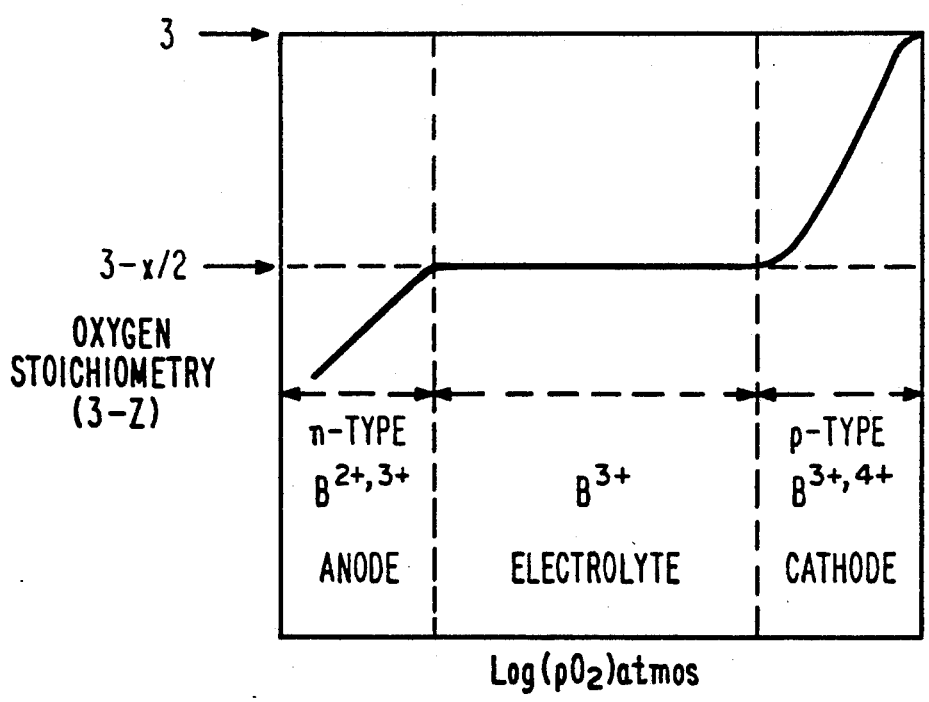
FIG. 5 is a plot showing idealized oxygen content and electronic characteristics for a $La_{1-x}D^{2+}_xBO_{3-z}$ perovskite as a function of the oxygen pressure.

The electronic properties and oxygen stoichiometry of the transition metal perovskites having formula (2), which are dependent upon oxygen pressure, can be controlled by changes in temperature or oxygen pressure and the extent of divalent-cation (D) substitutions on the A sites of the perovskite lattice. FIG. 5 shows an idealized representation of the oxygen content and electronic characteristics of a $Ln_{1-x}D^{2+}{}_xBO_{3-z}$ perovskite as a function of oxygen pressure. Ideally, the stoichiometry of these systems shows two well-defined plateaus, the first corresponding to the lattice stoichiometry where $z=0$ and the second to the electronic stoichiometry where $y=x/2$ and the average valence of B is 3+. At high oxygen pressures, electronic conduction, typically in the range of 1 to 100 S.cm$^{-1}$, results from the introduction of holes into the system either by the incorporation of excess oxygen into the lattice (i.e., Mn perovskites), or more generally from the divalent substitutions on the A-site (typically $D^{2+}=$Ca, Sr, or Ba). The conduction in these p-type regions can be metallic or activated generally via a $B^{3+}$-$B^{4+}$ hopping mechanism. P-type conductivity in the substituted perovskites is observed for oxygen stoichiometries with z less than $x/2$. When z is greater than 0 for these compositions, the oxygen vacancies in the perovskite lattice also lead to significant ionic contributions to the total conductivity and, therefore, result in mixed-conduction. As the oxygen pressure decreases, the number of p-type carriers decrease as the number of vacancies increase. For z equal to $x/2$, the electrical conductivity of the "electronically stoichiometric" oxide is a minimum. Because of the intrinsic stability of the 3+ state, this stoichiometry can be maintained over a wide range of oxygen pressure. It is in this region that the oxygen-ion contribution to the total conductivity can be maximized. At even lower oxygen pressures when z is greater than $x/2$, the introduction of n-type carriers leads to a rapid increase in the electronic conduction due to a $D^{2+}$-$D^{3+}$ electron hopping mechanism.

For an ideal transition metal perovskite, the oxygen-pressure gradient present in a fuel cell can lead to the oxygen stoichiometry profile shown in FIG. 5 and, thus, to the direct formation of a single-component (e.g., n-type anode/oxygen-ion conducting region/p-type cathode) cell. In fuel cells of the present invention, the transition metal perovskite is chemically modified to exhibit this idealized behavior over the typical oxygen pressure range experienced during the operation of the fuel cell.

The perovskites of the invention should possess good chemical stability at low oxygen pressure. They should also exhibit a minimum in their electronic conductivity in the potential electrolyte region over a wide range of oxygen pressures, as well as relatively low electronic contribution to the total conductivity. Iron-based perovskites are preferred in accordance with the present invention. In general, iron-based perovskites closely approximate the idealized behavior shown in FIG. 5. For example, Mizusaki, et al., *J. Solid State Chem.*, 1985, 58, 257 disclosed that the $La_{1-x}Sr_xFeO_{3-z}$ perovskite is stable under oxygen pressures as low as $10^{-18}$ atm. at 900° C. and $10^{-22}$ atm. at 700° C. Variations of the conductivity of $La_{1-x}Sr_xFeO_{3-z}$ with oxygen pressure, temperature and x from 0 to 0.25 have been reported by Mizusaki, *J. Amer. Ceram. Soc.*, 1983, 66, 247. The p- and n-type conductivities are typically in the range of 1 to 100 S.cm$^{-1}$, which is more than adequate for fuel cell operation.

The ability of the perovskite lattice to sustain considerable oxygen non-stoichiometry is believed to result in the wide range of electronic conductivities described above. It also is believed to result in high oxygen mobilities and, therefore, high oxygen-ion conductivities. Direct measurement of selected compositions in the $(La_{1-x}Sr_x)(Co_{1-y}Fe_y)O_{3-z}$ perovskites show conductivities of the perovskites can surpass those of many solid electrolytes. See, e.g., Teraoka, et al., *Mat. Res. Bull*, 1988, 23, 51.

Conductivity data reported by Teraoka, et al. for $La_{0.6}Sr_{0.4}FeO_{3-z}$ can be used to estimate the oxygen-transference numbers for iron perovskites in the region of electronic stoichiometry shown in FIG. 5. Combining this data with electronic conductivity data [See, e.g., Mizusaki, *J. Amer. Ceram. Soc.*, 1983, 66, 247] the expected oxygen-ion contribution to the conductivity of an electronically stoichiometric iron perovskite with $(La_{0.33}D_{.66})FeO_{2.67}$ is greater than 91.5 percent at 700° C. and greater than 84 percent at 800° C. The oxygen ion contribution in the $La_{1-x}Ba_x$ or $Sr_{1-x}X_x$ iron perovskites (X=Ce, Pr, Nd, Pm, Sm, Eu, Gd, Tb, Dy, Ho, Er, Tm, Yb, and Lu) should be well in excess of 0.91. Thus, other iron-based perovskites which can be employed in accordance with the present invention include the $La_{1-x}Ba_xFe_yQ_{1-y}O_3$ perovskites (Q=Cu, Co, Cr, Mn, Ni, V) and the $Sr_{1-x}X_xFe_yQ_{1-y}O_3$ perovskites (X=Ce, Pr, Nd, Pm, Sm, Eu, Gd, Tb, Dy, Ho, Er, Tm, Yb, and Lu) where x and y are, independently, 0 to about 1.

Many of the oxide electrolytes having formula (1) and the iron-based perovskites having formula (2) exhibit low oxygen-ion conductivities in the 600° C.-800° C. temperature range. They usually require the use of thin films to achieve useful current densities, particularly at the lower temperatures. The oxide electrolyte can be fabricated into the form of a dense, crack- and pore-free film about 1 to about 10 microns thick using a number of thin-film technologies such as magnetron sputtering. See, e.g., Barnett, Energy, 1990, 5, 1 and Barnett, et al., Proceedings of the EPRI/GRI Workshop on Ceramic Conductors for Solid State Electrochemical Devices, Snowbird, Utah, May 12-15, 1991. The use of magnetron sputtering, where the sputtered fluxes from metal targets are reacted with oxygen gas at the depositing film, has been shown to provide much higher deposition rates than sputtering from ceramic targets. Another attractive technology is electrochemical vapor deposition (EVD), which has been used to prepare thin films of yttria-stabilized zirconia and yttria-stabilized titania. see, e.g., U.S. Pat. Nos. 4,791,079 and 4,827,071, both in the name of Hazbun.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

What is claimed is:

1. A fuel cell, comprising:
   a single-component body having first and second non-adjacent sides, comprising:
   an anodic region formed at said first side;
   a cathodic region formed at said second side; and
   an oxygen ion-conducting region substantially free from anodic or cathodic character disposed between said anodic and cathodic regions;
   means for contacting fuel with said first side; and
   means for contacting oxidant with said second side.

2. A single-component body having first and second non-adjacent sides, comprising:
   an anodic region formed at said first side;
   a cathodic region formed at said second side; and
   an oxygen ion-conducting region substantially free from anodic or cathodic character disposed between said anodic and cathodic regions.

3. The body of claim 2 comprising oxide electrolyte having the formula:

$$R_xM_{1-x}O_{2-x/2}$$

wherein R is at least one rare earth element selected from the group consisting of yttrium, samarium, ytterbium, calcium, and strontium; M is at least one metal selected from the group consisting of zirconium, cerium, and bismuth; and x is from about 0.05 to about 0.25.

4. The body of claim 3 wherein said oxide electrolyte has the formula $Y_xZr_{1-x}O_{2-x/2}$.

5. The body of claim 3 wherein said anodic region includes one or more cations of titanium, ytterbium, europium, iron, manganese, vanadium, cerium, praseodymium, and niobium.

6. The body of claim 3 wherein said cathodic region includes one or more cations of terbium, bismuth, iron, manganese, and chromium.

7. The body of claim 3 wherein the anodic region and the cathodic region are mixed-conducting regions.

8. The body of claim 2 in the form of a substantially planar sheet.

9. The body of claim 2 wherein said first side and said second side are substantially parallel.

10. The body of claim 2 in the form of a tube.

11. The body of claim 2 wherein said first side and said second side are substantially concentric.

12. A process for fabricating a single-component body, comprising the steps of:
   providing a body having first and second non-adjacent sides, said body comprising oxide electrolyte;
   contacting said first side with dopant to form an anodic region at said first side; and
   contacting said second side with dopant to form a cathodic region at said second side;
wherein said contacting of said first side and said second side is effected such that said anodic region is separated from said cathodic region by an oxygen ion-conducting region substantially free from dopant.

13. The process of claim 12 wherein said oxide electrolyte has the formula:

$$R_xM_{1-x}O_{2-x/2}$$

wherein R is at least one rare earth element selected from the group consisting of yttrium, samarium, ytterbium, calcium, and strontium; M is at least one metal selected from the group consisting of zirconium, cerium, and bismuth; and x is from about 0.05 to about 0.25.

14. The process of claim 13 wherein said oxide electrolyte has the formula $Y_xZr_{1-x}O_{2-x/2}$.

15. The process of claim 12 wherein the dopant contacting said first side comprises one or more cations of titanium, ytterbium, europium, iron, manganese, vanadium, cerium, praseodymium, and niobium.

16. The process of claim 12 wherein the dopant contacting said second side comprises one or more cations of terbium, bismuth, iron, manganese, and chromium.

17. The single-component body produced by the process of claim 12.

18. A fuel cell, comprising:
   a single-component body having first and second non-adjacent sides and comprising transition metal perovskite;
   means for contacting fuel with said first side; and
   means for contacting oxidant with said second side.

19. A single-component body comprising transition metal perovskite and having first and second non-adjacent sides, wherein said body comprises an anodic region formed at said first side, a cathodic region formed at said second side, and an oxygen ion-conducting region substantially free from anodic or cathodic character disposed between said anodic and cathodic regions.

20. The single-component body of claim 19 wherein said transition metal perovskite has the formula:

$$ABO_{3-x}$$

wherein A is $Ln_{1-x}D^{2+}{}_x$; Ln is at least one lanthanide; D is at least one divalent metal; B is $N_{1-y}Q_y$ where N and Q are transition metals; x is 0 to about 1; is 0 to about 1; and z is less than 3.

21. The single-component body of claim 20 wherein Ln is lanthanum, yttrium, or strontium.

22. The single-component body of claim 20 wherein Ln is lanthanum.

23. The single-component body of claim 20 wherein D is calcium, barium, cerium, praseodymium, neodymium, promethium, samarium, europium, gadolinium, terbium, dysprosium, holmium, erbium, thulium, ytterbium, or lutetium.

24. The single-component body of claim 20 wherein B is iron or $Fe_{1-y}Q_y$ wherein Q is chromium, manganese, iron, cobalt, nickel, copper, or vanadium and y is 0 to about 1.

25. The single-component body of claim 19 wherein the anodic region and the cathodic region are mixed conducting regions.

26. The single component body of claim 15 wherein said anodic and cathodic regions are produced by an oxygen pressure gradient across said body.

27. A single component, multi-sided body comprising transition metal perovskite, wherein a first side of said body is in contact with oxidant at a first pressure and a second, non-adjacent side of said body is in contact with oxidant at a second pressure that is less than said first pressure.

28. A process for fabricating a fuel cell, comprising the steps of:
   providing a single-component body having first and second non-adjacent sides and comprising transition metal perovskite;
   contacting said first side with fuel; and
   contacting said second side with oxidant.

29. The process of claim 28 wherein said transition metal perovskite has the formula:

$$ABO_{3-x}$$

wherein A is $Ln_{1-x}D^{2+}{}_x$; Ln is at least one lanthanide; D is at least one divalent metal; B is $N_{1-y}Q_y$ where N and Q are transition metals selected from the group consisting of chromium, manganese, iron, cobalt, nickel, copper, and vanadium; x is 0 to about 1; y is 0 to about 1; and z is less than 3.

30. The process of claim 28 wherein contacting said second side with oxidant establishes an oxygen partial pressure gradient across said body.

31. The process of claim 30 wherein said gradient is established such that portions of said body proximate to said second side are exposed to relatively greater partial pressures of oxygen and portions of said body more distant from said second side are exposed to relatively lesser partial pressures of oxygen.

32. The fuel cell produced by the process of claim 25.

33. A multi-sided, single-component body which comprises oxide electrolyte and which has either an anodic region or a cathodic region formed at one side.

34. The single-component body of claim 33 wherein said oxide electrolyte has the formula:

$$R_xM_{1-x}O_{2-x/2}$$

wherein R is at least one rare earth element selected from the group consisting of yttrium, samarium, ytterbium, calcium, and strontium; M is at least one metal selected from the group consisting of zirconium, cerium, and bismuth; and x is from about 0.05 to about 0.25.

35. A process for fabricating a single-component body, comprising the steps of:
providing a body having at least one side, said body comprising oxide electrolyte;
contacting said side with dopant to form a either an anodic region or a cathodic region at said side.

36. The process of claim 35 wherein said oxide electrolyte has the formula:

$$R_xM_{1-x}O_{2-x/2}$$

wherein R is at least one rare earth element selected from the group consisting of yttrium, samarium, ytterbium, calcium, and strontium; M is at least one metal selected from the group consisting of zirconium, cerium, and bismuth; and x is from about 0.05 to about 0.25.

37. A multi-sided, single-component body which comprises transition metal perovskite and which has either an anodic region or a cathodic region formed at one side.

38. The single-component body of claim 37 wherein said transition metal perovskite has the formula:

$$ABO_{3-x}$$

wherein A is $Ln_{1-x}D^{2+}{}_x$; Ln is at least one lanthanide; D is at least one divalent metal; B is $N_{1-y}Q_y$ where N and Q are transition metals selected from the group consisting of chromium, manganese, iron, cobalt, nickel, copper, and vanadium; x is 0 to about 1; y is 0 to about 1; and z is less than 3.

39. A process for fabricating a multi-sided, single-component body having either an anodic region or a cathodic region formed at one side, comprising the steps of:
providing a multi-sided body comprising transition metal perovskite;
contacting a first side of said body with oxidant at a first pressure; and
contacting a second, non-adjacent side of said body with oxidant at a second pressure that is less than said first pressure.

* * * * *